Aug. 1, 1933.   D. FINLEY   1,920,901
PIPE WRAPPING MACHINE
Filed Jan. 12, 1931   2 Sheets-Sheet 2

INVENTOR.
DOZIER FINLEY
BY Charles S. Evans
HIS ATTORNEY

Patented Aug. 1, 1933

1,920,901

UNITED STATES PATENT OFFICE 1,920,901

PIPE WRAPPING MACHINE

Dozier Finley, Berkeley, Calif., assignor to The Paraffine Companies, Inc., San Francisco, Calif., a Corporation of Delaware Application January 12, 1931. Serial No. 508,143

21 Claims. (Cl. 242—11)

My invention relates broadly to a machine for imparting to a cylindrically-shaped object a combined rotary and longitudinal motion, and particularly to a pipe wrapping machine and to the pipe moving mechanism thereof.

It is one of the objects of my invention to provide movement of the character described, in which a belt drive is employed.

Another object of the invention is the provision of a belt drive in which means is provided for efficaciously holding the belt firmly against the pipe to prevent wobbling and provide firm tractional engagement with the pipe.

A further object of my invention is the provision of a belt drive machine, of the character described, in which tractional engagement with the pipe is provided for by a plurality of belts firmly contacting with the pipe.

Further objects of my invention include the provision of guide means for holding the belts about a substantial portion of the pipe surface; of means for adjustably positioning the guide means and belts to accommodate pipes of different sizes; and of means for varying the angular setting of the belts relative to the pipe axis to alter the pipe movement.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings.

Figure 1:
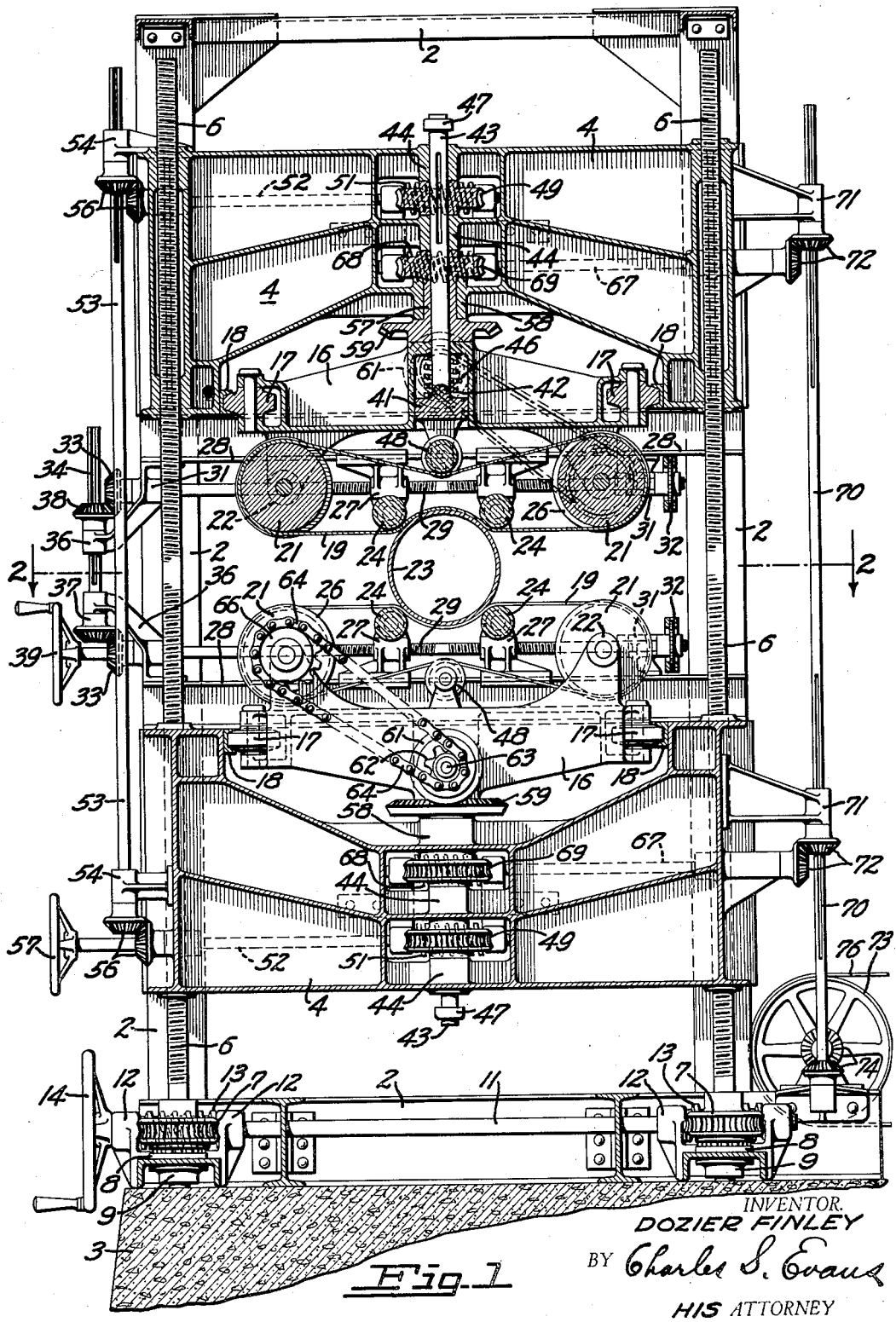
Figure 1 is a transverse vertical sectional view of the pipe wrapping machine embodying my invention; the upper portion of the pipe moving mechanism being shown in vertical section and the lower portion in end elevation.
Figure 2:
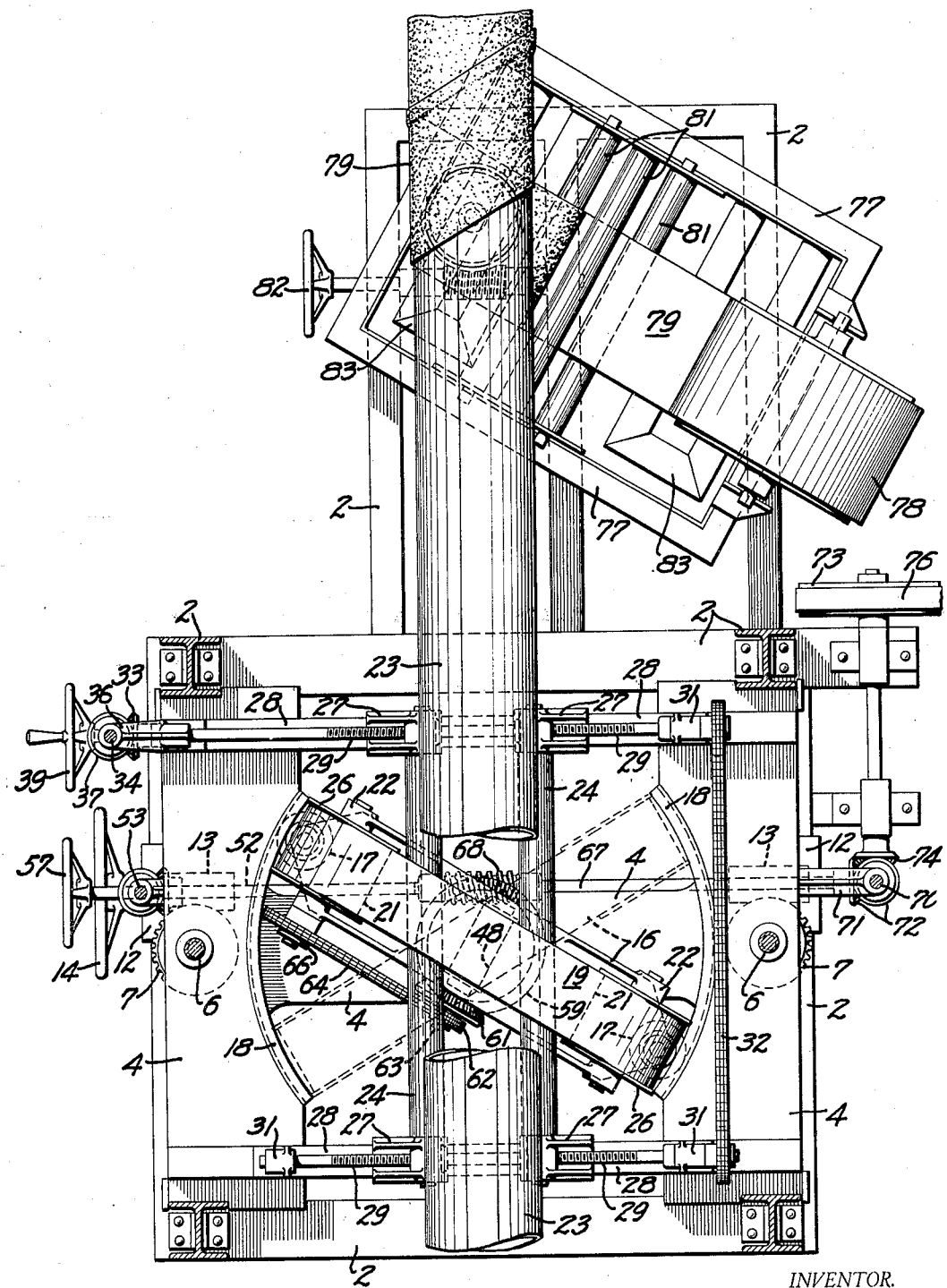
Figure 2 is a horizontal sectional view of the machine taken in a plane indicated by the line 2—2 of Figure 1.

In terms of broad inclusion the pipe wrapping machine embodying my invention comprises a belt adapted to tractionally engage the pipe, and set at a selected angle to the pipe axis. Guide means are provided for holding the belt about a substantial portion of the pipe surface, and means are provided for driving the belt to give the pipe a combined rotary and longitudinal motion. Means are provided for adjustably positioning the guide means and belt to accommodate pipes of different sizes, and means are provided for varying the angular setting of the belt relative to the pipe axis to alter the pipe movement. A pair of belts are preferably provided and are arranged in an oppositely disposed and crossed position about the pipe.

In greater detail the pipe wrapping machine embodying my invention comprises a frame 2 mounted on a suitable foundation 3. A pair of oppositely and vertically disposed supporting heads 4 are slidably mounted on the frame 2. The position of these heads is adjusted by a pair of vertically disposed elevator screws 6 journaled in the base of the frame 2 and threaded thru the ends of the supporting heads. The screw portions passing thru one of the heads have left hand threads, while the portions passing thru the other head have right hand threads, so that when the screws are rotated in one direction the heads are moved towards each other, and when rotated in the opposite direction the heads are moved away from each other.

Means are provided for rotating the elevator screws 6 to adjustably position the supporting heads 4. A worm gear 7 is secured to the lower end of each screw, and a thrust bearing 8 is interposed between the gear and the frame 2; a shaft fixed collar 9 being provided for holding the screw in its journaled position. A cross shaft 11 is journaled in the frame fixed bearings 12 adjacent the elevator screws 6, and is provided with the worms 13 meshed with the worm gears 7 of the screws. A hand wheel 14 provides means for rotating the shaft 11, and consequently the elevator screws 6, to move the supporting heads.

A pair of oppositely disposed rotors 16 are mounted on the supporting heads 4; one rotor being mounted on each head. The rotors are journaled in the heads by means of the rollers 17 running in the arcuate guide grooves 18 of the heads. A belt 19 is mounted on each rotor, and runs over a pair of pulleys 21 journaled in the rotor fixed bearings 22. These belts are positioned to tractionally engage a pipe 23, and guide means are provided for holding the belt about a substantial portion of the pipe surface.

The guide means preferably comprises a twin pair of rollers 24 arranged below and above the upper and lower portions respectively of the pipe surface; one pair of the rollers being mounted on each of the heads 4. As a belt reach passes off one of the pulleys 21 it runs over one of the guide rollers, passes over a substantial portion of the pipe surface, runs over the other guide roller, and finally passes on the other pulley.

In order to keep the belts from running off the pulleys 21 these pulleys are provided with the flanges 26. The guide rollers are parallel with the pipe axis, and extend across the rotor guide grooves 18 so that the rollers act to guide the belts in any position of the rotors.

Means are provided for moving the guide rollers in each pair to and away from each other for accommodating pipes of different sizes. The rollers 24 are freely journaled in the brackets 27 which are slidably mounted on the horizontal guideways 28 of the supporting heads 4. Suitable spreader screws 29 are journaled in the head fixed brackets 31, and are threaded thru the roller brackets 27; a screw being provided adjacent each of the ends of each pair of rollers. The screw portion in one of the roller brackets 27 is provided with a right hand thread, and the portion in the other has a left hand thread, so that when the spreader screws are turned in one direction the rollers in a pair are moved away from each other, and when they are turned in the other direction the rollers are moved toward each other.

The spreader screws for a pair of rollers are connected together by a chain drive 32, and one of the screws of each pair is provided with a bevel gear 33. A vertical shaft 34 is mounted adjacent the gears 33 and is supported by the bracket arms 36 of the heads 4. One end of the shaft carries a bevel gear 37 meshed with one of the spreader screw gears 33, and the other end is slidable thru a bevel gear 38 which is meshed with the gear 33 of the other spreader screw. A hand wheel 39 is mounted on one of the spreader screws, and, as is apparent from the above arrangement, when the hand wheel is turned all the guide rollers will be moved simultaneously and in parallelism. Due to the slidable gear 38 the heads 4 are allowed to move when the elevator screws 6 are rotated.

Means are provided for tensioning the belts to insure the tractional engagement thereof with the pipe. To this end the rectangular blocks 41 are slidably mounted in suitable recess 42 provided in the rotors 16. The rods 43 project vertically from the blocks, and are journaled in the bearings 44 of the heads 4. Suitable springs 46 urge the blocks 41 toward the open ends of their confining recesses, and the collars 47 on the ends of the projecting rods 43 serve to limit the block movement. The blocks 41 carry suitable idler pulleys 48 adapted to run on the free reaches of the belts. It is to be noted that there is considerable slack in the belts; this being provided for the larger sized pipes.

Means are provided for turning the rotors to vary the angular setting thereof relative to the pipe axis. The worm gears 49 are splined on the journaled rods 43, and are meshed with the worms 51 fixed on the cross shafts 52. These shafts are connected together by a vertical shaft 53, journaled in the head fixed bearing brackets 54, thru the bevel gears 56. In order to allow relative movement of the supporting heads 4, one of the gears 56 is slidable on the vertical connecting shaft 53.

A hand wheel 57 mounted on one of the cross shafts 52 provides means for turning the rods 43, and consequently the rotors 16, to vary the angular settings of the belts relative to the pipe axis. The mechanism is adjusted so that the belts, in one position thereof, are parallel and at right angles to the pipe axis. When the rotors are turned the belts are simultaneously moved, one in one direction and the other in the opposite direction, so that in any position thereof the crossed belts are set the same angle relative to the pipe axis.

Means are provided for driving the belts. The sleeves 57 are disposed about the rods 43, and are journaled in the bearings 58 of the heads 4. The ends of the sleeves, adjacent the rotors 16, are provided with the bevel gears 59 meshing with the pinion gears 61. These pinions are connected with the sprockets 62, and together are journaled on suitable stub shafts 63 mounted on rotors 16. The chains 64 running over the sprockets 62 and suitable sprockets 66 mounted on the pulley shafts serve to drive the belts when the sleeves are rotated.

Rotation of the sleeves 57 is effected by the cross shafts 67 which carry the worms 68 meshed with the sleeve connected worm gears 69. The shafts 67 are connected by a vertical shaft 70, journaled in the head fixed bearing brackets 71, thru the bevel gears 72. In order to allow relative movement of the supporting heads 4, one of the gears 72 is slidable on the vertical connecting shaft 70. The lower end of the shaft 70 is connected to a drive pulley 73 thru the gears 74; the pulley 73 being driven by a suitable belt 76. By this arrangement the belts are driven simultaneously, and at the same rate in opposite directions.

Any suitable means may be provided for applying a wrapping material to the pipe. For purposes of illustration a fluid tank 77 is shown pivotally mounted on the frame 2 below the pipe 23. A supply roll 78 of strip material 79 is mounted on the tank, and the strip is threaded over suitable rolls 81 to submerge the strip in the tank fluid. The strip is then directed to the pipe and applied thereto in a helical wrapping as the pipe moves past the wrapping station with a combined rotary and longitudinal motion. A hand wheel 82 serves to rotate the tank about its pivotal mounting to vary the angle at which the strip is directed to the pipe. Suitable heater tubes 83 are preferably arranged in the tank to heat the fluid.

*Operation.*—An operator first spreads the supporting heads 4 and the guide rollers 24 by turning the hand wheels 14 and 39 respectively. A pipe 23 is then introduced into the machine, so that the forward end of the pipe is positioned between the belts 19 and guide rollers 24. Since the spring pressed idler pulleys 48 keep the belts taut at all times the pipe may be inserted without trouble. The operator then moves the heads 4 toward each other, by proper manipulation of the hand wheel 14, until the belts 19 engage a substantial portion of the pipe surface. The amount of engagement may be varied by merely moving the supporting heads, depending upon the degree of tractional engagement desired.

After this adjustment is made the operator rotates the rotors 16 by turning the hand wheel 57, until the belts are set at the desired angle with the axis of the pipe, depending upon the motion to be given the pipe; it being understood that the relation between the rotary and longitudinal movements of the pipe, imparted thereto by the belt action, varies with the angle which the belts make with the pipe axis.

Following this adjustment the operator moves the guide rollers 24 toward each other, by proper manipulation of the hand wheel 39, until they contact with the belt and bear against the pipe. This action draws the belt over the pipe surface, so that the total surface area of the belt between the guide rollers is in contact with the pipe. This arrangement, together with the tensioning action of the idler 48, insures adequate traction between the belt and pipe. The belts 19 are preferably made of a suitable friction material, such as rubberized fabric, to further enhance the traction between the belts and pipe.

Having completed these adjustments the operator starts driving the belts. As a result, the pipe is moved forward with a combined rotary and longitudinal motion. At the wrapping station the pipe is stopped long enough to start the strip 79 on the pipe. The angular setting of the strip supporting means is adjusted to accord with the pipe movement imparted by the pipe moving means. When the belts are again started the strip is wound on the pipe in a helical wrapping.

The pipe is preferably supported along its path of movement by suitable rollers, and the pipes to be wrapped are preferably connected together by suitable couplings, so that the operation of the machine is substantially continuous. After the wrapped pipes leave the machine they may be separated by any suitable means, such as a rotary knife, adapted to move along with the pipe and cut the wrapping.

I claim:

1. A machine for imparting a combined rotary and longitudinal motion to a cylindrically-shaped object comprising an endless belt adapted to tractionally engage the object, means for holding said belt at a selected angle to the axis of said object, means contacting with the belt and bearing against the object for firmly holding the belt in tractional engagement with the object, and means for driving the belt.

2. A machine for imparting a combined rotary and longitudinal motion to a cylindrically-shaped object comprising an endless belt adapted to tractionally engage the object, spaced guide means contacting with the belt and bearing against the object for firmly holding the portion of the belt between the guide means in tractional engagement with the object, and means for driving the belt.

3. A machine for imparting a combined rotary and longitudinal motion to a cylindrically-shaped object comprising an endless belt adapted to tractionally engage the object, spaced guide rollers contacting with the belt and bearing against the object for firmly holding the portion of the belt between rollers in tractional engagement with the object, and means for driving the belt.

4. A machine for imparting a combined rotary and longitudinal motion to a cylindrically-shaped object comprising an endless belt adapted to tractionally engage the object, spaced guide rollers contacting with the belt and bearing against the object for firmly holding the portion of the belt between rollers in tractional engagement with the object, means for adjusting the distance between the rollers, and means for driving the belt.

5. A machine for imparting a combined rotary and longitudinal motion to a cylindrically-shaped object comprising an endless belt adapted to tractionally engage the object, spaced guide rollers contacting with the belt and bearing against the object for firmly holding the portion of the belt between rollers in tractional engagement with the object, mounting means for said belt and rollers for allowing movement thereof to and from the object, and means for driving the belt.

6. A machine for imparting a combined rotary and longitudinal motion to a cylindrically-shaped object comprising an endless belt adapted to tractionally engage the object, means for holding said belt at a selected angle to the axis of said object, spaced guide means contacting with the belt and bearing against the object for firmly holding the portion of the belt between the guide means in tractional engagement with the object, and means for driving the belt.

7. A machine for imparting a combined rotary and longitudinal motion to a cylindrically-shaped object comprising an endless belt adapted to tractionally engage the object, spaced guide rollers mounted parallel with the axis of the object, said guide rollers contacting with the belt and bearing against the object for firmly holding the portion of the belt between rollers in tractional engagement with the object, and means for driving the belt.

8. A machine for imparting a combined rotary and longitudinal motion to a cylindrically-shaped object comprising an endless belt positioned with one of its reaches contacting with the object and the other of its reaches spaced from the object and on the same side of the object as the first reach, spaced guide means contacting with the belt and bearing against the object for firmly holding the portion of the belt between the guide means in tractional engagement with the object, and means for driving the belt.

9. A machine for imparting a combined rotary and longitudinal motion to a cylindrically-shaped object comprising an endless belt positioned with one of its reaches contacting with the object and the other of its reaches spaced from the object and on the same side of the object as the first reach, another belt arranged similar to the first belt and positioned on the opposite side of the object, and means for driving the belts.

10. A pipe wrapping machine comprising a belt adapted to tractionally engage the pipe, guide means contacting with the belt and bearing against the pipe for holding the belt about a substantial portion of the pipe surface, means for tensioning the belt, and means for driving the belt.

11. A pipe wrapping machine comprising a belt adapted to tractionally engage the pipe, guide means contacting with the belt and bearing against the pipe for holding the belt about a substantial portion of the pipe surface, said belt being set at a selected angle relative to the pipe axis, means for varying the angular setting of the belt, and means for driving the belt.

12. A pipe wrapping machine comprising a belt adapted to tractionally engage the pipe, a pair of guide rollers contacting with the belt and bearing against the pipe for holding the belt about a substantial portion of the pipe surface, means for adjustably positioning said rollers relative to the pipe, and means for driving the belt.

13. A pipe wrapping machine comprising a belt adapted to tractionally engage the pipe, a pair of guide rollers contacting with the belt and bearing against the pipe for holding the belt about a substantial portion of the pipe surface, means for adjustably positioning said rollers relative to the pipe, means for adjustably positioning the belt relative to the pipe, and means for driving the belt.

14. A pipe wrapping machine comprising a belt adapted to tractionally engage the pipe, a pair of guide rollers contacting with the belt and bearing against the pipe for holding the belt about a substantial portion of the pipe surface, means for spreading said rollers, means for bodily moving the rollers and belt relative to the pipe, and means for driving the belt.

15. A pipe wrapping machine comprising a pair of crossed belts oppositely disposed about the pipe and adapted to tractionally engage the pipe, guide means for holding the belts about a substantial portion of the pipe surface, and means for driving the belts.

16. A pipe wrapping machine comprising a pair of crossed belts oppositely disposed about the pipe and adapted to tractionally engage the pipe, guide means for holding the belts about a substantial portion of the pipe surface, each of said belts being set at the same angle relative to the pipe axis, means for simultaneously adjusting the belts to vary said angle, and means for driving the belts.

17. A pipe wrapping machine comprising a pair of crossed belts oppositely disposed about the pipe and adapted to tractionally engage the pipe, guide means for holding the belts about a substantial portion of the pipe surface, each of said belts being set at the same angle relative to the pipe axis, means for simultaneously positioning said belts relative to the pipe, means for simultaneously positioning said rollers relative to the pipe, and means for driving the belts.

18. A pipe wrapping machine comprising a frame, a rotor mounted on said frame, an endless belt mounted on said rotor, means for turning said rotor, means for moving the rotor to and from the pipe, and means for driving the belt.

19. A pipe wrapping machine comprising a frame, a rotor mounted on said frame, a pair of guide rollers mounted on said frame, an endless belt mounted on said rotor so that one reach thereof is adapted to run on said rollers, means for turning said rotor, means for moving the rotor to and from the pipe and means for driving the belt.

20. A pipe wrapping machine comprising a frame, a head slidably mounted on said frame, a rotor journaled on the head, a pair of guide rollers slidably mounted on said head, an endless belt mounted on the rotor so that one reach thereof is adapted to run on said rollers, means for moving the head, means for turning the rotor, means for moving the rollers, and means for driving the belt.

21. A machine for imparting a combined rotary and longitudinal motion to a cylindrically-shaped object comprising a belt adapted to tractionally engage the object, mounting means for said belt allowing bodily movement thereof to and from the pipe, and means for driving the belt.

DOZIER FINLEY.